US009166737B2

(12) United States Patent
Papasakellariou et al.

(10) Patent No.: US 9,166,737 B2
(45) Date of Patent: Oct. 20, 2015

(54) EXTENSION OF PHYSICAL DOWNLINK CONTROL CHANNELS IN A COMMUNICATION SYSTEM

(75) Inventors: Aris Papasakellariou, Houston, TX (US); Young-Bum Kim, Seoul (KR); Jianzhong Zhang, Dallas County, TX (US)

(73) Assignee: Samsung Electronics Co., Ltd (KR)

( * ) Notice: Subject to any disclaimer, the term of this patent is extended or adjusted under 35 U.S.C. 154(b) by 319 days.

(21) Appl. No.: 13/572,250

(22) Filed: Aug. 10, 2012

(65) Prior Publication Data

US 2013/0039299 A1 Feb. 14, 2013

Related U.S. Application Data

(60) Provisional application No. 61/522,399, filed on Aug. 11, 2011.

(51) Int. Cl.
| | |
|---|---|
| *H04W 4/00* | (2009.01) |
| *H04L 1/00* | (2006.01) |
| *H04L 1/18* | (2006.01) |
| *H04L 5/00* | (2006.01) |
| *H04L 1/08* | (2006.01) |

(52) U.S. Cl.
CPC ............ *H04L 1/0039* (2013.01); *H04L 1/0073* (2013.01); *H04L 1/1893* (2013.01); *H04L 5/0023* (2013.01); *H04L 5/0048* (2013.01); *H04L 5/0055* (2013.01); *H04L 5/0094* (2013.01); *H04L 1/08* (2013.01); *H04L 5/001* (2013.01)

(58) Field of Classification Search
CPC .. H04L 27/2627; H04L 1/0073; H04L 1/1893
USPC .......................................................... 370/329
See application file for complete search history.

(56) References Cited

U.S. PATENT DOCUMENTS

| | | | |
|---|---|---|---|
| 2007/0058755 A1* | 3/2007 | Husted | 375/332 |
| 2010/0034158 A1 | 2/2010 | Meylan | |
| 2010/0034186 A1* | 2/2010 | Zhou et al. | 370/344 |
| 2010/0039970 A1* | 2/2010 | Papasakellariou et al. | 370/310 |
| 2010/0067468 A1 | 3/2010 | Ho et al. | |
| 2010/0087210 A1 | 4/2010 | Lee et al. | |
| 2010/0115367 A1 | 5/2010 | Hsu | |
| 2010/0331030 A1* | 12/2010 | Nory et al. | 455/509 |
| 2011/0026473 A1* | 2/2011 | Luo et al. | 370/329 |
| 2011/0044196 A1* | 2/2011 | Ishii | 370/252 |
| 2011/0076962 A1* | 3/2011 | Chen et al. | 455/68 |
| 2011/0170496 A1* | 7/2011 | Fong et al. | 370/329 |

(Continued)

*Primary Examiner* — Guang Li
*Assistant Examiner* — Joe Combs
(74) *Attorney, Agent, or Firm* — The Farrell Law Firm, P.C.

(57) ABSTRACT

Methods and apparatuses are described for a User Equipment (UE) to receive enhanced Control CHannels (eCCHs), including enhanced Physical Downlink Control CHannels (ePDCCHs), transmitted in a set of Resource Blocks (RBs) over a Transmission Time Interval (TTI). A method includes transmitting a first control signal to a first UE over a first number of Resource Elements (Res) in a subset of the RBs and over a first number of the transmission symbols in the TTI; transmitting a second control signal to a second UE over a second number of the REs in the subset of the RBs and over a second number of the transmission symbols in the TTI; and transmitting a reference signal of the first type over a third number of the REs in the subset of the RBs and over a third number of the transmission symbols in the TTI.

16 Claims, 15 Drawing Sheets

(56) References Cited

U.S. PATENT DOCUMENTS

| | | | |
|---|---|---|---|
| 2011/0200004 A1* | 8/2011 | Nakashima et al. | 370/330 |
| 2011/0206014 A1* | 8/2011 | Lee et al. | 370/335 |
| 2011/0299513 A1* | 12/2011 | Suzuki et al. | 370/338 |
| 2011/0310856 A1* | 12/2011 | Hariharan et al. | 370/336 |
| 2012/0106465 A1* | 5/2012 | Haghighat et al. | 370/329 |
| 2012/0201187 A1* | 8/2012 | Koo et al. | 370/312 |
| 2012/0207099 A1* | 8/2012 | Lindh et al. | 370/329 |
| 2012/0213310 A1* | 8/2012 | Ko et al. | 375/295 |
| 2012/0282936 A1* | 11/2012 | Gao et al. | 455/450 |
| 2012/0309403 A1* | 12/2012 | Mekhail et al. | 455/450 |
| 2013/0003604 A1* | 1/2013 | Blankenship et al. | 370/255 |
| 2013/0003663 A1* | 1/2013 | Blankenship et al. | 370/329 |
| 2013/0100833 A1* | 4/2013 | Xu et al. | 370/252 |
| 2013/0223402 A1* | 8/2013 | Feng et al. | 370/330 |
| 2014/0133346 A1* | 5/2014 | Kang et al. | 370/252 |
| 2014/0146799 A1* | 5/2014 | Park et al. | 370/336 |
| 2014/0161056 A1* | 6/2014 | Moulsley et al. | 370/329 |

* cited by examiner

EXTENSION OF PHYSICAL DOWNLINK CONTROL CHANNELS IN A COMMUNICATION SYSTEM

PRIORITY

The present application claims priority under 35 U.S.C. §119(e) to U.S. Provisional Application No. 61/522,399, which was filed in the United States Patent and Trademark Office on Aug. 11, 2011, the entire disclosure of which is incorporated herein by reference.

BACKGROUND OF THE INVENTION

1. Field of the Invention

The present invention relates generally to wireless communication systems, and more particularly, to transmitting physical downlink control channels.

2. Description of the Art

A communication system includes a DownLink (DL) that conveys transmission signals from transmission points such as Base Stations (BSs) (or NodeBs) to User Equipments (UEs), and an UpLink (UL) that conveys transmission signals from UEs to reception points such as NodeBs. A UE, which is also commonly referred to as a terminal or a Mobile Station (MS), may be fixed or mobile and may be a cellular phone, a personal computer device, etc. A NodeB is generally a fixed station and may also be referred to as an Access Point (AP) or some other equivalent terminology.

DL signals include data signals, which carry information content, control signals, and Reference Signals (RSs), which are also known as pilot signals. A NodeB transmits data signals through respective Physical Downlink Shared CHannels (PDSCHs) and transmits control signals through respective Physical Downlink Control CHannels (PDCCHs). UL signals also include data signals, control signals, and RSs. UEs transmit data signals through respective Physical Uplink Shared CHannels (PUSCHs) and transmit control signals through respective Physical Uplink Control CHannels (PUCCHs). It is possible for a UE having transmission of data information to also transmit control information through the PUSCH.

Downlink Control Information (DCI), which serves several purposes, is conveyed through DCI formats transmitted in respective PDCCHs. For example, DCI includes DL Scheduling Assignments (SAs) for respective PDSCH receptions by UEs and UL SAs for respective PUSCH transmissions from UEs. As PDCCHs are a major part of the total DL signaling overhead, their resource requirements directly affect DL throughput.

Accordingly, one method for reducing PDCCH overhead is to scale its size according to the resources required to transmit the DCI formats during a DL Transmission Time Interval (TTI).

Assuming Orthogonal Frequency Division Multiplexing (OFDM) as the DL transmission method, a Control Format Indicator (CFI) parameter transmitted through a Physical Control Format Indicator CHannel (PCFICH) can be used to indicate a number of OFDM symbols for a DL control region in a DL TTI.

A frequency resource unit, which is also referred to as a Resource Block (RB), includes a number of sub-carriers or Resource Elements (REs), e.g., 12 REs. A PDSCH transmission can occur over a number of RBs and over a number of OFDM symbols, e.g., over all OFDM symbols in a DL TTI, after a DL control region.

FIG. 1 illustrates a conventional structure for PDCCH transmissions in a DL TTI.

Referring to FIG. 1, a DL TTI includes a subframe having N=14 OFDM symbols. A DL control region occupies a first M OFDM symbols 110. A remaining N−M OFDM symbols are used primarily for PDSCH transmissions 120, and a PCFICH 130 is transmitted in some REs of a first OFDM symbol and provides 2 CFI bits indicating a DL control region size of M=1, M=2, or M=3 OFDM symbols.

Some OFDM symbols also include RS REs 140 and 150, which assumes that there are two NodeB antenna ports. These RS REs 140 and 150 are transmitted over substantially an entire DL operating BandWidth (BW) and are referred to as Common RSs (CRSs), as they can be used by each UE for performing channel measurements and for demodulating control or data signals. A CRS is transmitted without precoding, i.e., without applying a phase to its transmission, or with a same precoding (phase) as for all control or data signals for which a UE uses the CRS for demodulation.

In addition to a CRS, other RS types for a DL subframe include a DeModulation RS (DMRS) that is transmitted only in RBs used for PDSCH transmission to a UE (the DMRS uses UE-specific precoding and is associated with a data signal using a same precoding), and a Channel State Information (CSI) RS that is periodically transmitted in some subframes, without UE-specific precoding, and is intended to primarily serve for measurement.

Additional control channels may be transmitted in a DL control region but are not shown for brevity. For example, when using a Hybrid Automatic Repeat reQuest (HARQ) process for data transmission in a PUSCH, a NodeB may transmit a Physical Hybrid-HARQ Indicator CHannel (PHICH) to indicate to a UE whether a previous transmission of data Transport Blocks (TBs) in a PUSCH was correctly received, i.e., an ACKnowledgement (ACK), or incorrectly received, i.e., a Negative ACK (HACK).

Each Control CHannel (CCH) transmitted with the conventional structure illustrated in FIG. 1 will be referred to herein as a conventional CCH (cCCH) including a cPDCCH, a cPCFICH, and a cPHICH.

FIG. 2 illustrates a conventional encoding process for a DCI format.

Referring to FIG. 2, a NodeB separately codes and transmits each DCI format in a respective cPDCCH. A Radio Network Temporary Identifier (RNTI) for a UE for which a DCI format is intended for masks a Cyclic Redundancy Check (CRC) of a DCI format codeword in order to enable a UE to identify that a particular DCI format is intended for it. Alternatively, a DCI-type RNTI may mask a CRC, if a DCI format provides UE-common information. The CRC 220 of (non-coded) DCI format bits 210 is computed and it is subsequently masked 230 using an eXclusive OR (XOR) operation between CRC and RNTI bits 240. For example, the XOR operation is XOR(0,0)=0, XOR(0,1)=1, XOR(1,0)=1, XOR (1,1)=0, and both a CRC and an RNTI have 16 bits.

The masked CRC bits are appended to DCI format information bits 250, followed by channel coding 260, e.g., using a convolutional code, by rate matching 270 to allocated resources, interleaving and modulating 280, and transmitting a control signal 290.

FIG. 3 illustrates a conventional decoding process for a DCI format.

Referring to FIG. 3, a received control signal 310 is demodulated and de-interleaved 320, a rate matching applied in a NodeB transmitter is restored 330, and data is subsequently decoded 340. After decoding, DCI format information bits 360 are obtained after extracting CRC bits 350, which are then de-masked 370 by applying an XOR operation with a UE RNTI 380 (or a DCI-type RNTI). Finally, a UE performs a CRC test 390.

If the CRC test passes, a UE considers a DCI format as valid and determines parameters for signal reception or signal transmission. If the CRC test does not pass, a UE disregards a presumed DCI format.

To avoid a cPDCCH transmission to a UE blocking a cPDCCH transmission to another UE, a location of each cPDCCH transmission in the time-frequency domain of a DL control region is not unique. Consequently, a UE must perform multiple decoding operations to determine whether there are cPDCCHs intended for it in a DL subframe.

The REs carrying each cPDCCH are grouped into conventional Control Channel Elements (cCCEs) in the logical domain. For a given number of DCI format bits, a number of cCCEs for a respective cPDCCH depends on a channel coding rate, e.g., Quadrature Phase Shift Keying (QPSK)).

A NodeB may use a lower channel coding rate and more cCCEs for a cPDCCH transmission to a UE experiencing a lower DL Signal-to-Interference and Noise Ratio (SINR) than to a UE experiencing a higher DL SINR. The possible cCCE aggregation levels for a cPDCCH transmission may be, for example, 1, 2, 4, and 8 cCCEs.

For a cPDCCH detection process, a UE may determine a search space for candidate cPDCCH transmissions after it restores cCCEs in the logical domain according to a common set of cCCEs for all UEs (i.e., a Common Search Space (CSS)) and according to a UE-dedicated set of cCCEs (i.e., a UE-Dedicated Search Space (UE-DSS)). For example, a CSS includes the first C cCCEs in the logical domain, and a UE-DSS may be determined according to a pseudo-random function having as inputs UE-common parameters, such as the subframe number or the total number of cCCEs in a DL subframe, and UE-specific parameters such as a RNTI. For example, for cCCE aggregation levels $L \in \{1,2,4,8\}$, cCCEs corresponding to a cPDCCH candidate in are given in Equation (1).

$$\text{cCCEs for cPDCCH candidate } m = L \cdot \{(Y_k + m) \bmod \lfloor N_{CCE,k}/L \rfloor\} + i \quad (1)$$

In Equation (1), $N_{CCE,k}$ is a total number of cCCEs in subframe k, i=0, ..., L−1, m=0, ..., $M_C^{(L)}$−1, and $M_C^{(L)}$ is a number of cPDCCH candidates to monitor in a search space. Exemplary values of $M_C^{(L)}$ for $L \in \{1,2,4,8\}$ are, respectively, {6, 6, 2, 2}. For a CSS, $Y_k$=0. For a UE-DSS, $Y_k = (A \cdot Y_{k-1}) \bmod D$, where $Y_{-1}$=RNTI≠0, A=39827 and D=65537.

If enough cCCEs remain after transmissions of DCI formats conveying UE-common information, a CSS may also convey some DCI formats for DL SAs or UL SAs. A UE-DSS exclusively conveys DCI formats for DL SAs or UL SAs. For example, a CSS may include 16 cCCEs and support 2 DCI formats with L=8 cCCEs, or 4 DCI formats with L=4 cCCEs, or 1 DCI format with L=8 cCCEs and 2 DCI formats with L=4 cCCEs. The cCCEs for a CSS are placed first in the logical domain (prior to interleaving).

FIG. 4 illustrates a conventional transmission process for cPDCCHs.

Referring to FIG. 4, after channel coding and rate matching, as illustrated in FIG. 2, the encoded DCI format bits are mapped in the logical domain to cCCEs of a cPDCCH. The first 4 cCCEs (L=4), cCCE1 401, cCCE2 402, cCCE3 403, and cCCE4 404 are used for cPDCCH transmission to UE1. The next 2 cCCEs (L=2), cCCE5 411 and cCCE6 412, are used for cPDCCH transmission to UE2. The next 2 cCCEs (L=2), cCCE7 421 and cCCE8 422, are used for cPDCCH transmission to UE3, and the last cCCE (L=1), cCCE9 431, is used for cPDCCH transmission to UE4.

DCI format bits are scrambled 440 by a binary scrambling code and are subsequently modulated 450. Each cCCE is divided into conventional Resource Element Groups (cREGs). For example, a cCCE having 36 REs can be divided into 9 cREGs, each having 4 REs.

Interleaving 460 is applied among cREGs (blocks of 4 QPSK symbols). For example, a block interleaver may be used where interleaving is performed on symbol-quadruplets (4 QPSK symbols corresponding to the 4 REs of a cREG) instead of on individual bits.

After interleaving the cREGs, a resulting series of QPSK symbols is shifted by J symbols 470, and each QPSK symbol is mapped to an RE 480 in a DL control region.

Therefore, in addition to a CRS from NodeB transmitter antenna ports 491 and 492, and other control channels such as a PCFICH 493 and a PHICH (not shown), REs in a DL control region include QPSK symbols for cPDCCHs corresponding to DCI formats for UE1 494, UE2 495, UE3 496, and UE4 497.

FIG. 5 illustrates a conventional transmission process for a CFI.

Referring to FIG. 5, a NodeB transmitter generates CFI bits 510, e.g., 2 CFI bits, encodes the CFI bits and performs a number of repetitions 520 to obtain a sequence of encoded CFI bits. For example, a (3, 2) Hamming code and 11 repetitions of the encoded CFI bits may apply to obtain sequences of 32 encoded bits, after puncturing the last repeated encoded bit. The sequences of encoded bits are modulated using QPSK 530 and the output is mapped to frequency disperse cREGs 540 and transmitted in a cPCFICH 550.

FIG. 6 illustrates a conventional reception process for a CFI.

Referring to FIG. 6, a UE receiver receives a cPCFICH 610, accumulates repeated transmissions of encoded CFI bits over respective cREGs 620, demodulates an accumulated output 630, decodes resulting bits 640, and obtains an estimate of the transmitted CFI bits 650.

The cPHICH cREGs is placed only in a first OFDM symbol or over a maximum of three OFDM symbols of a DL control region. A cPHICH transmission in each cREG is not confined in only one RE, but in order to provide interference randomization, it is spread over all REs in each cREG. To avoid reducing a cPHICH multiplexing capacity (by a factor of 4 for a cREG of 4 REs), orthogonal multiplexing of cPHICH transmissions may apply within each cREG using orthogonal codes with a Spreading Factor (SF) equal to $N_{SF,freq}^{cPHICH}$. For a cREG of 4 REs, the orthogonal codes are Walsh-Hadamard (WH) codes with $N_{SF,freq}^{cPHICH}$. For QPSK modulation and 1-bit HARQ-ACK for each data TB received by a NodeB, each cPHICH may be placed on the In-phase (I) or the Quadrature (Q) component of a QPSK constellation and may be modulated with a WH code over each cREG.

For $N_{SF,freq}^{cPHICH}$, the 1-bit HARQ-ACK multiplexing capacity of each cPHICH is $2N_{SF,freq}^{cPHICH}=8$ (obtained from the 2 dimensions of QPSK (I/Q and from $N_{SF,freq}^{cPHICH}=4$). Therefore, multiple cPHICHs separated by I/Q multiplexing and by different WH codes are mapped to a same set of REs in one or more cREGs and constitute a cPHICH group.

FIG. 7 illustrates a conventional transmission of a HARQ-ACK bit in a cPHICH.

Referring to FIG. 7, a HARQ-ACK bit 710 is multiplied 722, 724, 726, and 728, by each element of the WH code 732, 734, 736, 738 and a resulting output is placed on the I-branch of a QPSK modulated RE 742, 744, 746, and 748 (the Q-branch may be used to transmit another HARQ-ACK bit).

The WH code may be one of 4 WH codes 750. With I/Q multiplexing and orthogonal sequence multiplexing with $N_{SF,freq}^{cPHICH}=4$, 8 cPHICHs are provided within one cREG. As for a CFI transmission, a transmission in each cPHICH group may be repeated over multiple cREGs to obtain frequency diversity and improve the effective SINR of each HARQ-ACK signal.

A UE receiver for a cPHICH only performs the conventional functions of QPSK demodulation and WH code despreading (and averaging over repeated cPHICH group transmissions as discussed below), which is similar to the cPFCICH UE receiver functions illustrated in FIG. 6 (with the exception of WH code dispreading).

A cPHICH resource is identified by a pair ($n_{cPHICH}^{group}$, $n_{cPHICH}^{seq}$), where $n_{cPHICH}^{group}$ is a cPHICH group number and $n_{cPHICH}^{seq}$ is a WH code index within a cPHICH group. A number of cPHICH groups is $n_{cPHICH}^{group}=\lceil N_g(N_{RB}^{DL}/8)\rceil$, where $N_g \in \{1/6,1/2,1,2\}$ is a parameter informed to UEs through a broadcast channel, $N_{RB}^{DL}$ is a total number of RBs in a DL BW, and $\lceil\ \rceil$ is a "ceiling" operation rounding a number to its next integer.

A UE is normally informed of $N_{RB}^{DL}$ prior to a cPHICH reception, but this may not be possible for the total number of UL RBs, $N_{RB}^{UL}$, in an UL BW. Accordingly, $N_{RB}^{DL}$ (not $N_{RB}^{UL}$) is used to specify $N_{cPHICH}^{group}$. A cPHICH group number is determined as shown in Equation (2).

$$n_{cPHICH}^{group}=(I_{RB\_RA}^{lowest\_index}+CSI) \bmod N_{cPHICH}^{group} \quad (2)$$

Further, a WH code index within a group is determined as shown in Equation (3).

$$n_{cPHICH}^{seq}=(\lfloor I_{RB\_RA}^{lowest\_index}/N_{cPHICH}^{group}\rfloor+CSI) \bmod 2N_{SF,freq}^{cPHICH} \quad (3)$$

In Equations (2) and (3) $I_{RB\_RA}^{lowest\_index}$ represents a smallest RB index of a PUSCH transmitting a data TB corresponding to a HARQ-ACK bit transmitted in a cPHICH, CSI represents a CSI of a Zadoff-Chu (ZC) sequence used for DMRS transmission in a PUSCH, and $\lfloor\ \rfloor$ is a "floor" operation rounding a number to its previous integer.

cPHICH resources corresponding to consecutive UL RBs are mapped to different cPHICH groups. For simplicity, one data TB per PUSCH is assumed herein, but the above expressions can be generalized for multiple data TBs per PUSCH.

A DL control region for transmitting cCCHs uses a maximum of M=3 OFDM symbols and each cCCH is transmitted over substantially an entire DL BW. Consequently, the DL control has limited capacity and cannot achieve interference co-ordination in the frequency domain.

There are several cases where expanded capacity or interference co-ordination in the frequency domain is used for transmitting CCHs. For example, one such case is a communication system with cell aggregation, where DL SAs or UL SAs for UEs in multiple cells are transmitted in a single cell. Another case is an extensive use of spatial multiplexing, where multiple DL SAs or UL SAs schedule respective PDSCHs or PUSCHs in same respective resources. Another case is when DL transmissions in one cell experience strong interference from DL transmissions in another cell and DL interference co-ordination in the frequency domain between the two cells is needed.

However, due to the cREG-based transmission and interleaving of the cCCHs, a conventional DL control region cannot be expanded to include more OFDM symbols while maintaining compatible operation with existing UEs, which will not be aware of such expansion.

An alternative is to extend a DL control region in the PDSCH region and use individual RBs over a number of subframe symbols for transmitting enhanced CCHs (eCCHs) and include ePDCCH, ePCFICH, and ePHICH.

FIG. 8 illustrates a conventional structure for eCCH transmissions.

Referring to FIG. 8, although eCCH transmissions start immediately after cCCH transmissions 810 and are over all remaining subframe symbols, alternatively, they may start at a fixed location, such as the fourth OFDM symbol, and extend over a part of the remaining subframe symbols. In FIG. 8, eCCH transmissions occur in four RBs, 820, 830, 840, and 850, while the remaining RBs are used for PDSCH transmissions 860, 862, 864, 866, and 868.

However, several aspects for an eCCH operation in FIG. 8 still need to be defined in order to provide a functional design.

One aspect is the RS used for demodulation of eCCHs. A CRS transmitted over an entire DL BW may not always exist or may not always be received by all UEs without significant interference. Therefore, the CRS may not be generally relied upon for demodulating eCCHs. A DMRS is associated with UE-specific precoding and although UE-specific DMRS can be associated with an eCCH transmission to a UE, the UE-specific DMRS cannot be associated with multiple eCCH transmissions to respectively multiple UEs.

Another aspect is the multiplexing and transmission of an ePCFICH and the functionality for a respective eCFI indicating a size of an enhanced control region in a respective DL subframe.

Another aspect is the multiplexing and transmission structure for an ePHICH in an enhanced control region.

Another aspect is the multiplexing and support for a CSS and for a UE-DSS for ePDCCH transmissions and detections.

Therefore, there is a need to define an operation for an enhanced DL control region.

There is another need to define an RS used by multiple UEs for demodulating respective eCCHs transmitted over multiple RBs.

There is another need to define a multiplexing and transmission structure for an ePCFICH and an operation for a respective eCFI.

There is another need to define a multiplexing and transmission structure for ePHICHs.

Finally, there is another need to define a multiplexing and transmission process for an ePDCCH in an enhanced CSS or an enhanced UE-DSS and a UE operation for detecting this ePDCCH.

SUMMARY OF THE INVENTION

Accordingly, the present invention has been designed to solve at least the aforementioned limitations and problems in the prior art and provide at least the advantages described below.

An aspect of the present invention is to provide a method and apparatus for transmitting and receiving eCCHs.

Another aspect of the present invention is to provides a method and apparatus for designing a transmission of a RS for demodulating eCCHs.

Another aspect of the present invention is to provides a method and apparatus for designing an operation for an ePCFICH and its multiplexing, transmission, and reception.

Another aspect of the present invention is to provides a method and apparatus for designing a multiplexing, transmission, and reception scheme for an ePHICH.

In accordance with an aspect of the present invention, a method for transmitting control signals and reference signals of a first type from a number of antenna ports over a Transmission Time Interval (TTI) in a subset of frequency Resource Blocks (RBs) of a set of RBs corresponding to an operating bandwidth is provided. Each of the RBs includes a number of Resource Elements (REs) and the TTI includes a number of transmission symbols. The method includes transmitting a first control signal to a first User Equipment (UE) over a first number of the REs in the subset of the frequency RBs and over a first number of the transmission symbols in the TTI; transmitting a second control signal to a second UE over a second number of the REs in the subset of the frequency RBs and over a second number of the transmission symbols in the TTI; and transmitting a reference signal of the first type over a third number of the REs in the subset of the frequency RBs and over a third number of the transmission symbols in the TTI. For a same antenna port and a same RB in the subset of the frequency RBs, the first control signal, the second control signal, and the reference signal of the first type are transmitted with a same phase.

In accordance with another aspect of the present invention, a method is provided for transmitting a Physical Downlink Control CHannel (PDCCH) to a User Equipment (UE) over a Transmission Time Interval (TTI) including a number of transmission symbols. The method includes configuring, to the UE, a first set of frequency Resource Blocks (RBs) and a second set of frequency RBs, wherein each of the RBs includes Resource Elements (REs); and transmitting, to the UE, the PDCCH over a number of the transmission symbols in the TTI and over a number of the REs located either in the first set of the frequency RBs or in the second set of the frequency RBs.

In accordance with another aspect of the present invention, a User Equipment (UE) apparatus is provided for detecting a Physical Downlink Control CHannel (PDCCH) over a Transmission Time Interval (TTI) including a number of transmission symbols. The UE includes a receiver for receiving a configuration of a first set of frequency Resource Blocks (RBs) and a second set of frequency RBs, wherein each of the RBs includes Resource Elements (REs); and a detector for detecting the PDCCH over the number of transmission symbols in the TTI and over a number of the REs located either in the first set of the frequency RBs or in the second set of the frequency RBs.

BRIEF DESCRIPTION OF THE DRAWINGS

The above and other aspects, features, and advantages of the present invention will be more apparent from the following detailed description, when taken in conjunction with the accompanying drawings, in which.

DETAILED DESCRIPTION OF EMBODIMENTS OF THE INVENTION

Various embodiments of the present invention will now be described more fully hereinafter with reference to the accompanying drawings. This present invention may, however, be embodied in many different forms and should not be construed as limited to the embodiments set forth herein. Rather, these embodiments are provided so that this disclosure will be thorough and complete and will fully convey the scope of the present invention to those skilled in the art.

Additionally, although the embodiments of the present invention will be described below with reference to Orthogonal Frequency Division Multiplexing (OFDM), they also are applicable to all Frequency Division Multiplexing (FDM) transmissions in general and to Discrete Fourier Transform (DFT)-spread OFDM in particular.

In accordance with an embodiment of the present invention, aspects for an eCCH design include:

a) A unit for an eCCH transmission is an eREG.
b) An ePDCCH transmission includes at least one eCCE. An eCCE includes eREGs. An eCCE may or may not have the same size as a cCCE.
c) The number of eREGs per RB depends on the existence of various RS types in an RB, such as a CRS, a DMRS, or a CSI-RS. REs assumed by a UE to be used for transmitting various RS types are assumed to not be used by an eREG for transmitting an eCCH.
d) OFDM symbols for an eCCH transmission in an RB may be all symbols remaining in a subframe after a conventional DL control region or may be a fixed number of symbols.
e) Demodulation of eCCHs may be based either on a CRS transmitted only in RBs of a respective enhanced control region, which is referred to as NarrowBand CRS (NB-CRS), or on a CRS transmitted over an entire DL BW, i.e., WideBand CRS (WB-CRS), or on a DMRS. An NB-CRS may or may not have a same structure as a WB-CRS.
f) An RB of an enhanced control region may include eREGs used to transmit a single eCCH or multiple eCCHs.

The following structure is considered for an enhanced control region:
a) A transmission of eCCHs starts at the fourth OFDM symbol (or, alternatively, after the end of transmissions of cCCHs, if UEs decode a PCFICH) and extends over all remaining subframe symbols.
b) The demodulation of eCCHs is based on a CRS transmitted in eCCH RBs (i.e., an NB-CRS). A UE may also be instructed by a NodeB, through UE-specific higher layer signaling or through a broadcast channel, to also use a WB-CRS for eCCH demodulation.

For example, in an RB including RS REs (either for an NB-CRS, a WB-CRS, a CSI-RS, or a DMRS), there may be 8 REs available for eREGs and, for an eREG size of 4 REs, there may be 2 eREGs per RB. An RB may contain RS REs for transmission of only some of the NB-CRS, WB-CRS, or CSI-RS, or may not contain any RS REs at all.

Figure 9:
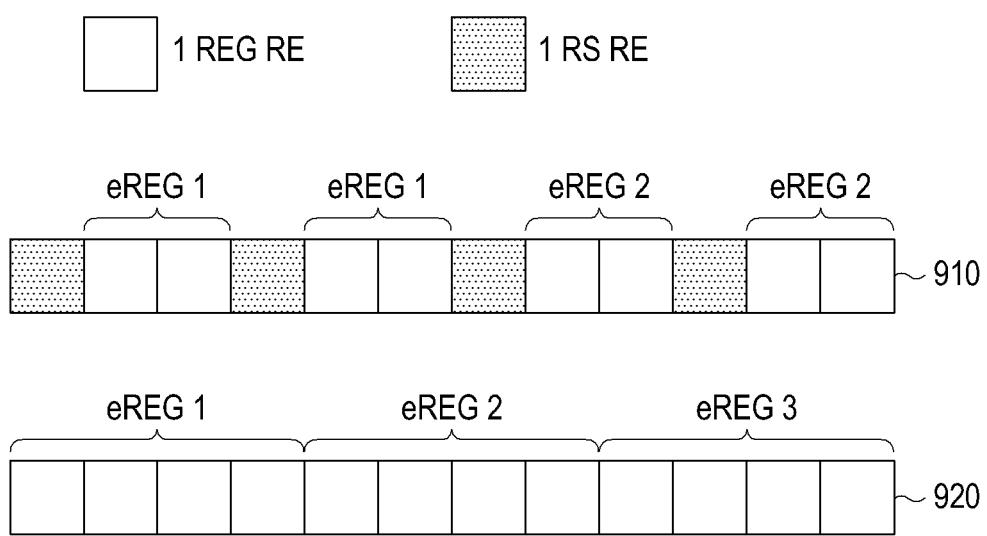
FIG. 9 is a diagram illustrating eREGs in an RB used for transmitting eCCHs in a subframe according to an embodiment of the present invention.

FIG. 9 illustrates eREGs in an RB used for transmitting eCCHs in a subframe according to an embodiment of the present invention.

Referring to FIG. 9, if an RB during an OFDM symbol used to transmit eCCHs includes RS REs, the RB includes 2 eREGs 910. If the RB does not contain any RS REs, the RB contain 3 eREGs 920. Accordingly, a number of eREGs in an RB depends on a number of RS REs in an OFDM symbol.

In accordance with an embodiment of the present invention, a structure for an extended control region for transmitting eCCHs in conjunction with a structure for an ePCFICH is provided. A NodeB informs a UE through UE-specific higher layer signaling, e.g., Radio Resource Control (RRC) signaling, or through UE-common broadcast signaling, of a minimum set of RBs used for transmitting eCCHs over a DL subframe. This minimum set of RBs may be common to all UEs or it may be different for some UEs.

An ePCFICH is transmitted only in this configured set of RBs. An ePCFICH conveys an eCFI that is used to dimension a set of RBs for transmitting eCCHs in a respective subframe. Configurations performed by higher layer or broadcast signaling are referred to as a being semi-static. Configurations performed per subframe by an eCCH are referred to as being dynamic.

The eCFI payload and encoding and modulation process may be same as the respective ones for a CFI. However, unlike cPCFICH, a larger number of repetitions may be used for an ePCFICH to provide a same reception reliability for an eCFI as for a CFI because the frequency diversity obtained for an ePCFICH transmission may be smaller than the frequency diversity obtained for a cPCFICH transmission, and the quality of a channel estimate for ePCFICH demodulation, which may be based on a NB-CRS, may be worse than the quality of a channel estimate for cPCFICH demodulation, which is based on a WB-CRS. Further, unlike a CFI for which 3 of the 4 states are meaningful (the ones indicating that a control region is over one, two, or three OFDM symbols), all 4 states of a 2-bit eCFI may provide valid information, which furthers a need for supporting a larger number of repetitions for the ePCFICH.

Figure 10:
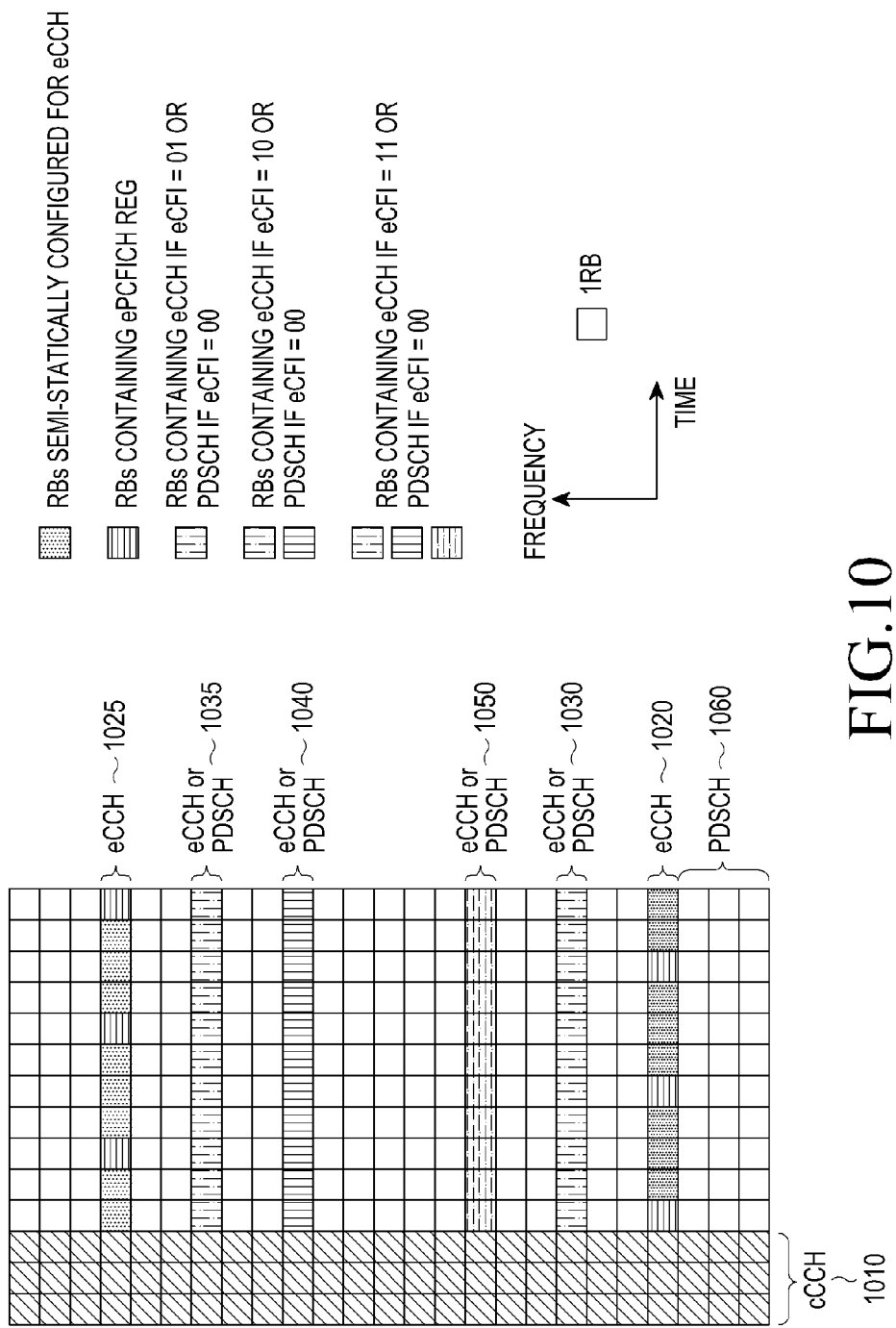
FIG. 10 is a diagram illustrating a transmission of an ePCFICH and a structure for transmissions of eCCHs according to an embodiment of the present invention.

FIG. 10 illustrates a transmission of an ePCFICH and a structure for transmitting eCCHs according to an embodiment of the present invention.

Referring to FIG. 10, eCCHs are transmitted following transmissions of cCCHs 1010 in a subframe. An ePCFICH is transmitted in a subset of OFDM symbols available for transmitting eCCHs and in a subset of eREGs located in RBs semi-statically configured by a NodeB for transmitting eCCHs 1020 and 1025 over a DL subframe. An ePCFICH conveys an eCFI that is used to dimension a number of RBs used for transmitting eCCHs. For example, an eCFI includes 2 bits with the values of '00', '01', '10' and '11' respectively indicating that there are no additional RBs for transmissions of eCCHs in that subframe, that RBs 1030 and 1035 are also used, that RB 1040 is also used, or that RB 1050 is also used for transmitting eCCHs in the respective subframe. The remaining RBs are used to transmit PDSCHs 1060.

The number of valid eCFI states, their interpretation, and the number of repetitions for a transmission of encoded eCFI bits are also configurable by a NodeB or are fixed in the system operation. For example, for system BWs including a small number of RBs, an eCFI may be limited to 2 or 3 states (in case of 2 states, simple repetition of 1-bit CFI without any coding can apply). For system BWs including a large number of RBs, more granularity for a total size of an enhanced control region may be required and an eCFI may provide 4 states.

A mapping of eCFI states to a number of RBs used to transmit eCCHs may also be configurable by a NodeB instead of being fixed in the system operation. For example, depending on the scheduler strategy, a finer or coarser granularity for a number of RBs used to transmit eCCHs may be desirable and a given eCFI value may additionally configure 2 RBs or 4 RBs.

The number of ePCFICH repetitions are also configurable by a NodeB, instead of being fixed in the system operation. For example, for a NodeB with only one transmitter antenna port or for operation in a frequency non-selective channel (for a given operating BW), a larger number of ePCFICH repetitions will be required than for a NodeB with multiple transmitter antenna ports that can employ transmitter antenna diversity or for operation in a frequency selective channel where an ePCFICH transmission experiences frequency diversity.

Further, RBs allocated to transmissions of eCCHs in response to an ePCFICH indication may be deterministically assigned, e.g., at a fixed location relative to a first RB, providing sufficient frequency diversity for transmitting eCCHs or the RBs may be semi-statically configured by a NodeB.

Figure 11:
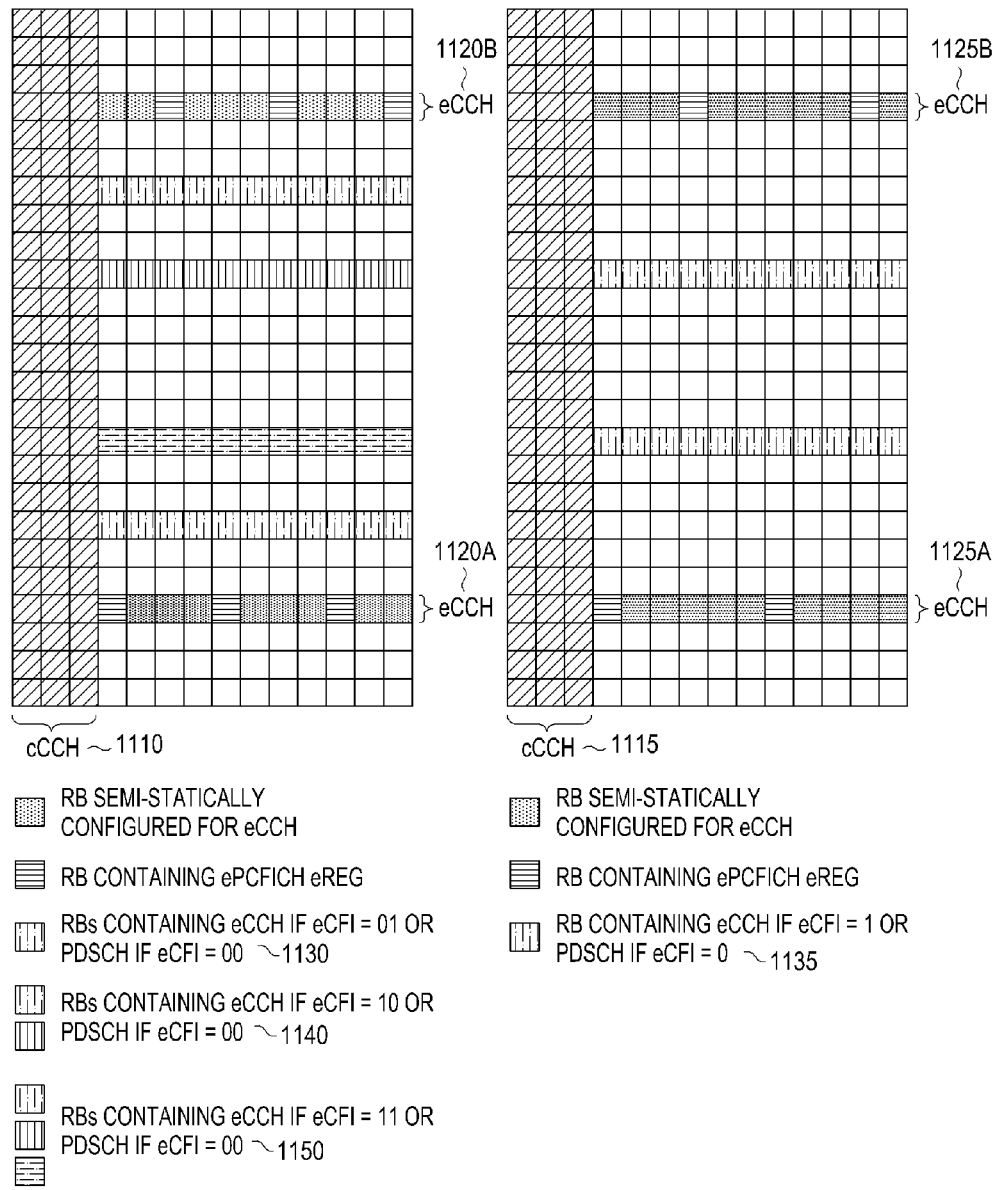
FIG. 11 is a diagram illustrating two different configurations for an interpretation of an eCFI according to an embodiment of the present invention.

FIG. 11 illustrates two different configurations for an interpretation of an eCFI according to an embodiment of the present invention.

Referring to FIG. 11, an ePCFICH is transmitted in eREGs of RBs a NodeB semi-statically configured to be available over a subframe and in a subset of OFDM symbols in these RBs determined according to a required number of repetitions for encoded eCFI bits. There are 11 OFDM symbols available for transmitting eCCHs in FIG. 11 and the ePCFICH is transmitted in a subset of 6 of them (in 3 OFDM symbols in each of 2 RBs configured to always be present).

A conventional control region includes the first three OFDM symbols in a DL subframe 1110 and 1115. In a first configuration for an interpretation of an eCFI according to an embodiment of the present invention, an ePCFICH is transmitted in 6 eREGs distributed in both semi-statically configured RBs and in different OFDM symbols 1120A and 1120B. An eCFI indicates one of 4 possible states with the second, third, and fourth states, respectively, configuring progressively more RBs used for transmissions of eCCHs 1130, 1140, and 1150 in a DL subframe. For a given eCFI value, the corresponding RBs used to transmit eCCHs in a subframe are a super-set of the RBs corresponding to an immediately smaller eCFI value, if any.

In a second configuration for an interpretation of an eCFI according to an embodiment of the present invention, an ePCFICH is transmitted in 4 eREGs distributed in both semi-statically configured RBs and in different OFDM symbols 1125A and 1125B. An eCFI indicates one of 2 possible states, with the second state indicating a separate set of two more RBs for transmissions of eCCHs 1135 in the DL subframe.

In accordance with an embodiment of the present invention, a structure for ePHICH transmissions is provided. Specifically, ePHICH transmissions occur in RBs that are semi-statically configured by a NodeB. Accordingly, an outcome of an ePHICH reception is independent of an outcome of an ePCFICH reception, if any, at a UE.

Figure 12:
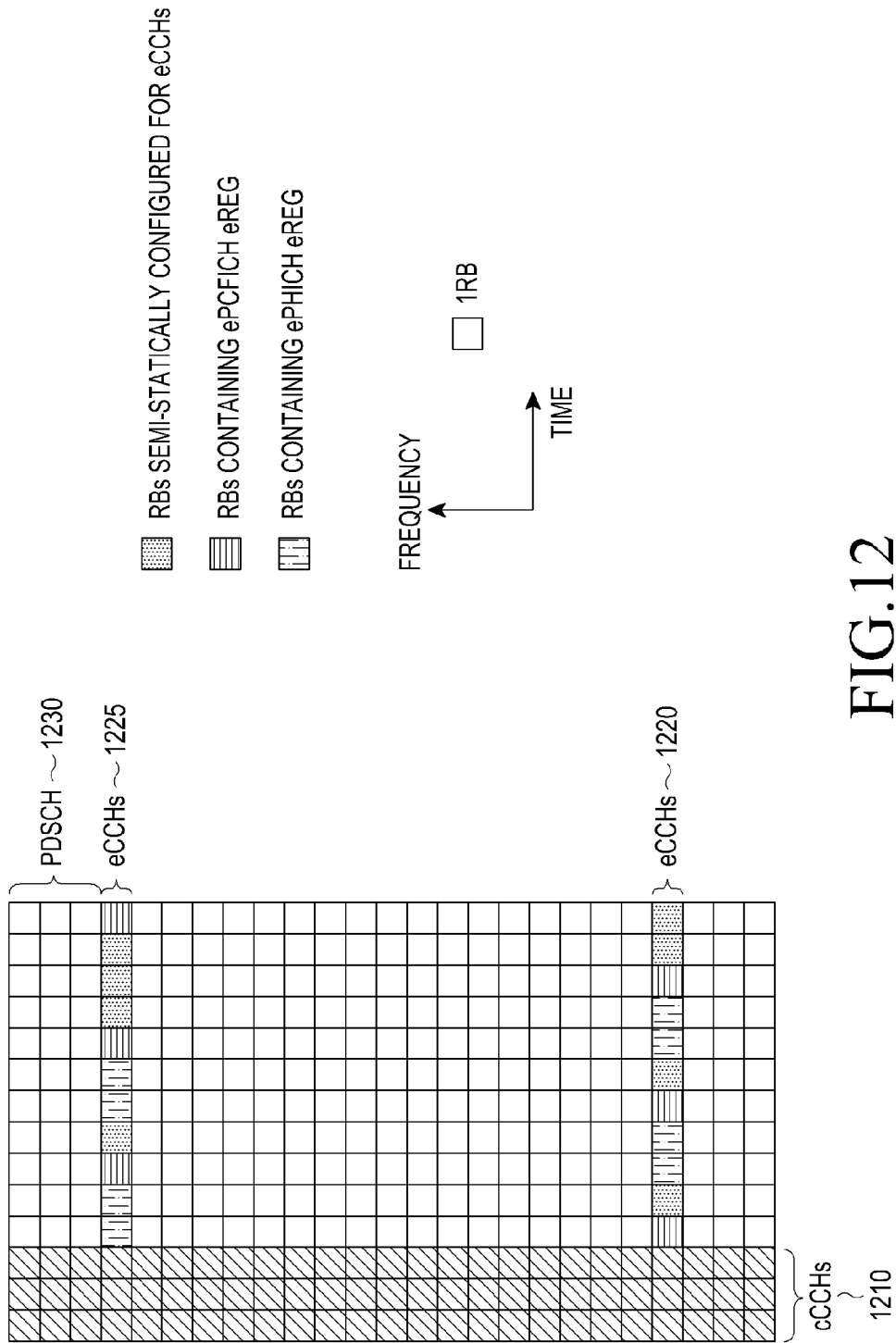
FIG. 12 is a diagram illustrating transmissions of ePHICHs in semi-statically configured RBs according to an embodiment of the present invention.

FIG. 12 illustrates transmissions of ePHICHs in semi-statically configured RBs according to an embodiment of the present invention.

Referring to FIG. 12, after transmitting cCCHs 1210, ePHICHs are transmitted in a subset of OFDM symbols available for transmissions of eCCHs and in a subset of eREGs located in RBs semi-statically configured for transmissions of eCCHs 1220 and 1225 in a DL subframe. The remaining RBs are used for PDSCH transmissions 1230. Although eREGs for transmitting ePHICHs are illustrated to be in different OFDM symbols than eREGs for transmission of an ePCFICH, they may also be located in a same OFDM symbol. Further, during an OFDM symbol, multiple eREGs for an ePHICH transmission may be located in a same RB or in multiple RBs.

An ePHICH transmission in a same RB during different OFDM symbols allows for the introduction of time domain orthogonality and frequency domain orthogonality across REs of an eREG.

Figure 13:
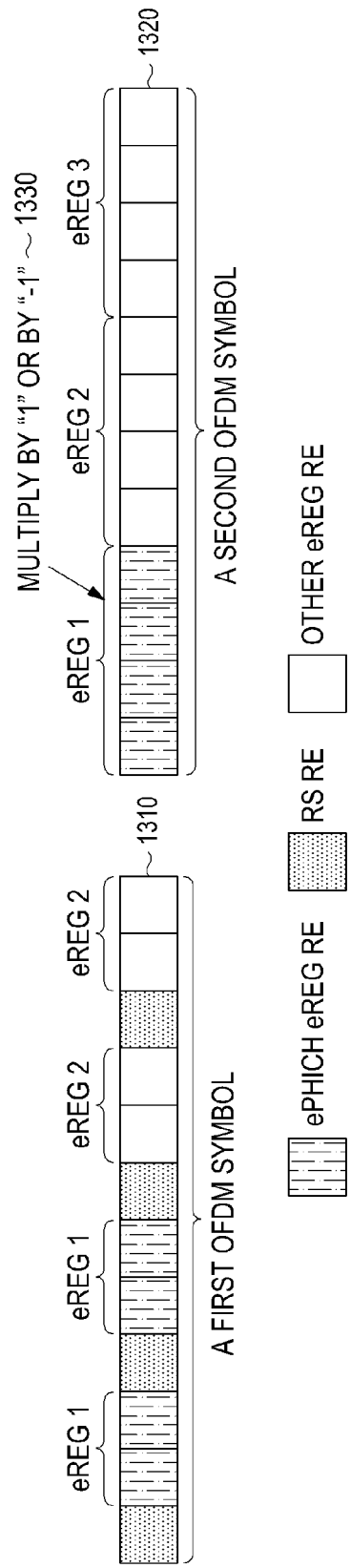
FIG. 13 is a diagram illustrating an application of an orthogonal code in the time domain for an ePHICH transmission according to an embodiment of the present invention.

FIG. 13 illustrates an application of an orthogonal code in the time domain for an ePHICH transmission according to an embodiment of the present invention.

Figure 1:
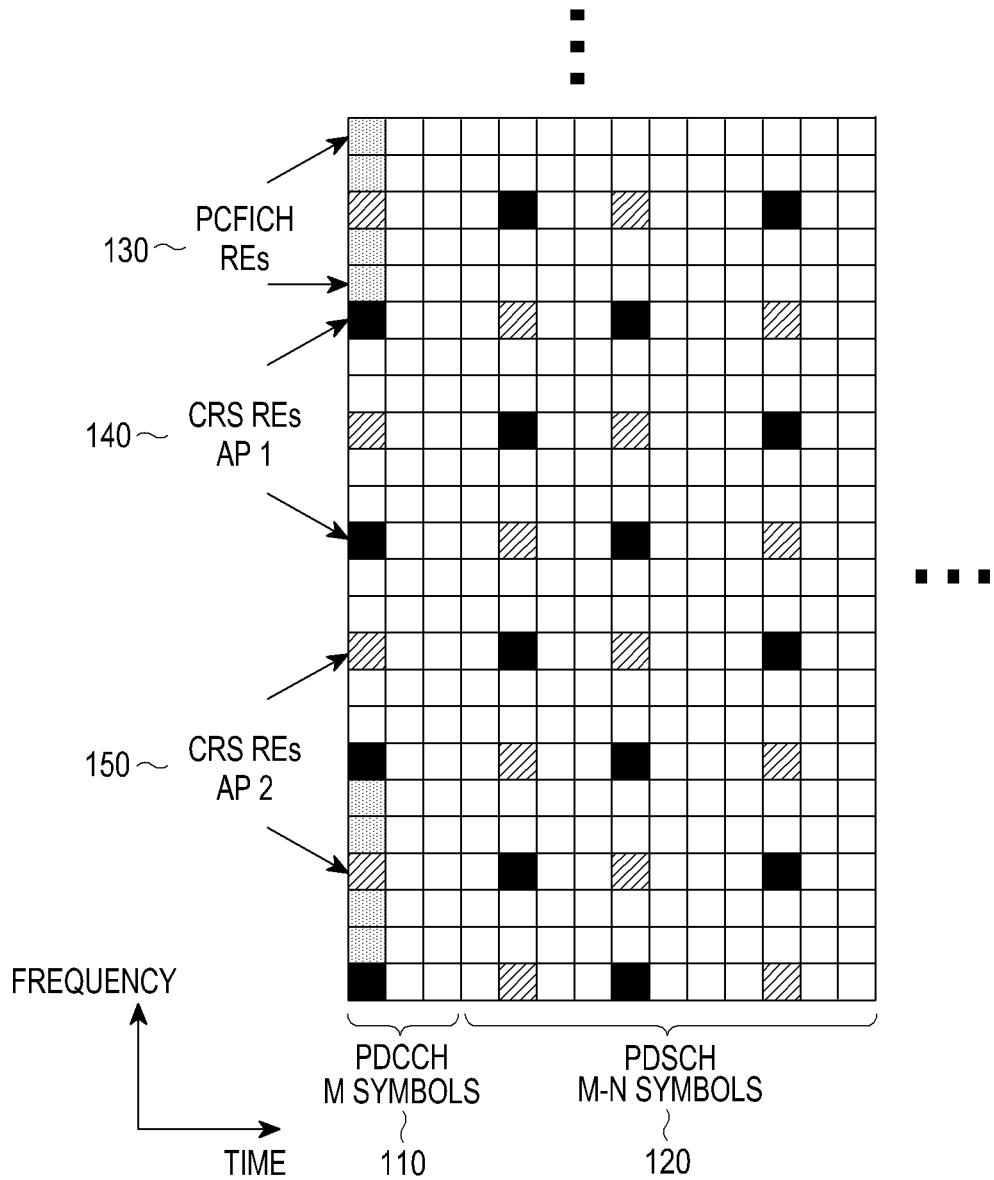
FIG. 1 is a diagram illustrating a structure for conventional PDCCH transmissions.
Figure 2:
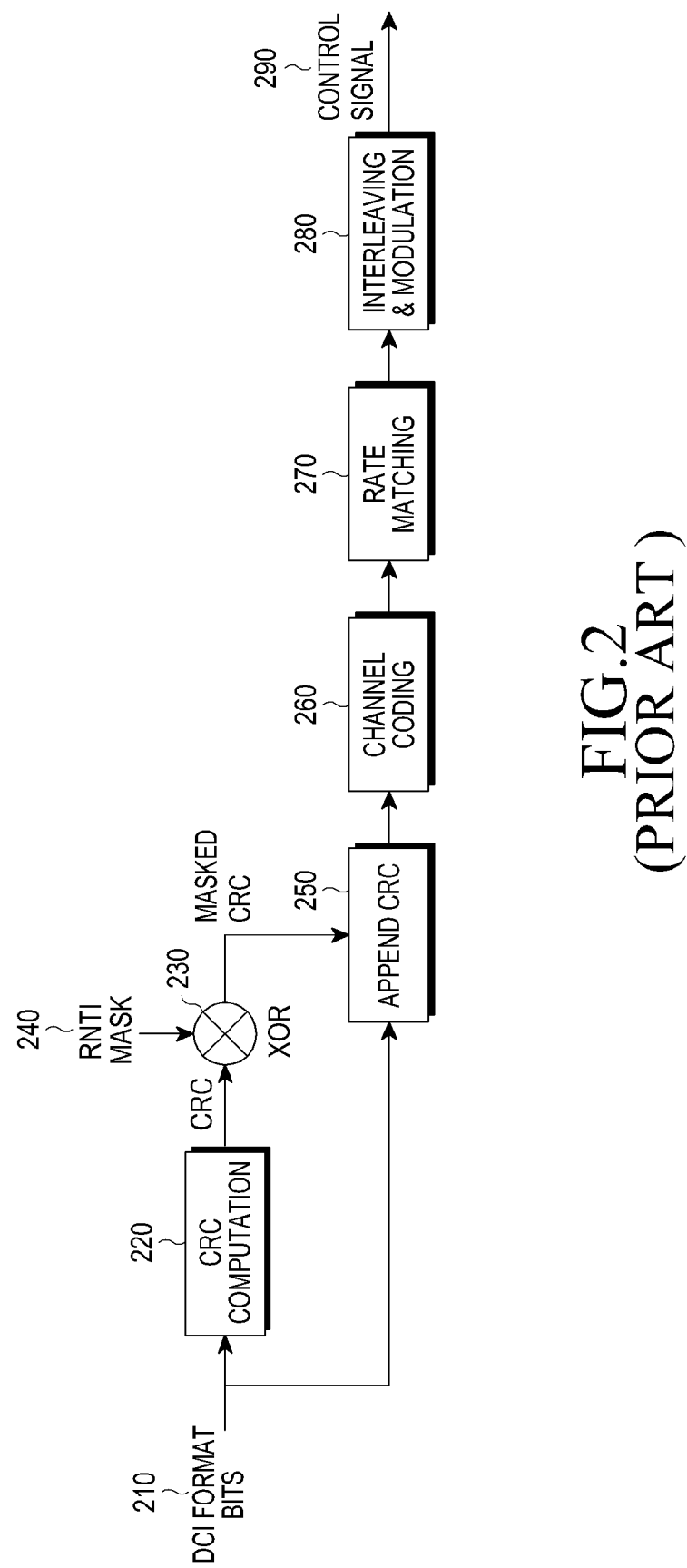
FIG. 2 is a block diagram illustrating a conventional encoding process for a DCI format.
Figure 3:
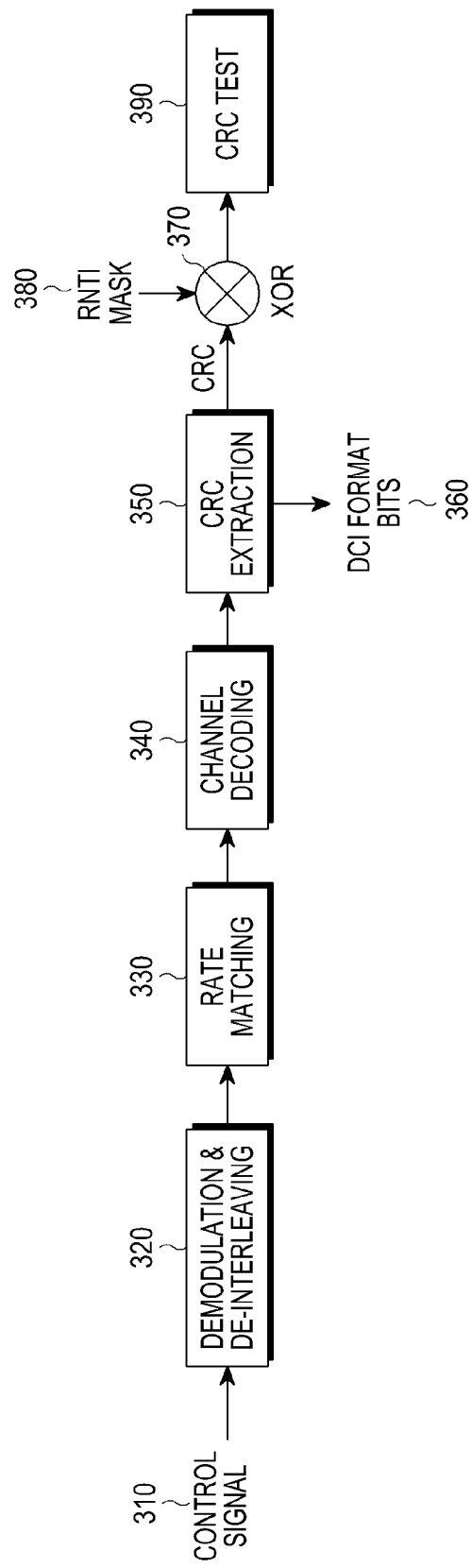
FIG. 3 is a block diagram illustrating a conventional decoding process for a DCI format.
Figure 4:
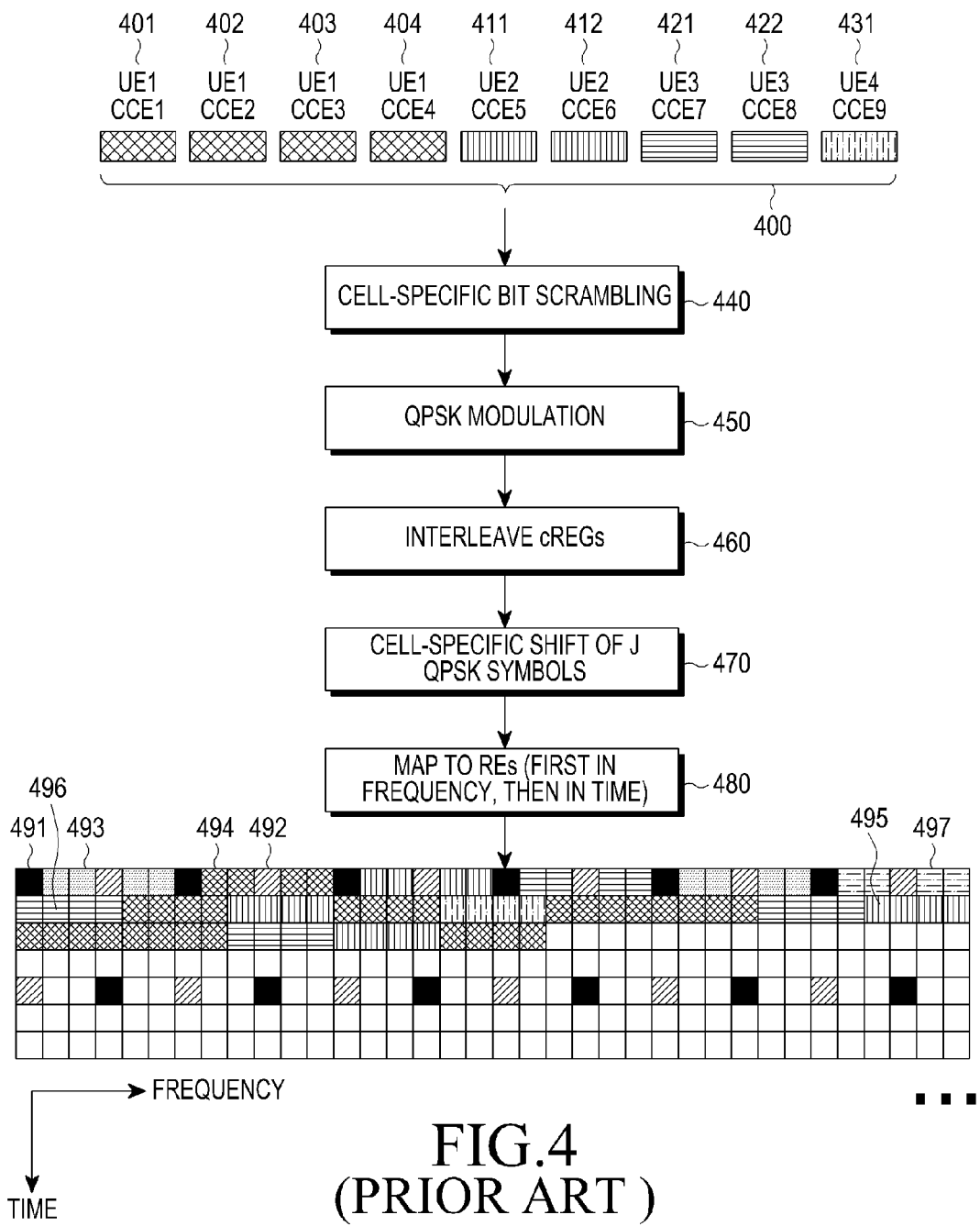
FIG. 4 is a diagram illustrating a conventional transmission process for conventional PDCCHs.
Figure 5:
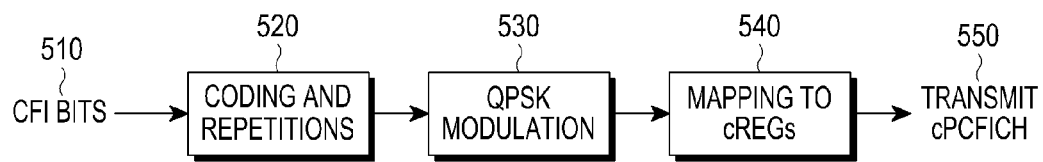
FIG. 5 is a block diagram illustrating a conventional transmission process for a CFI.
Figure 6:
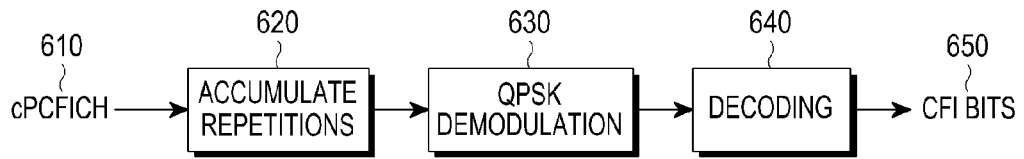
FIG. 6 is a block diagram illustrating a conventional reception process for a CFI.
Figure 7:
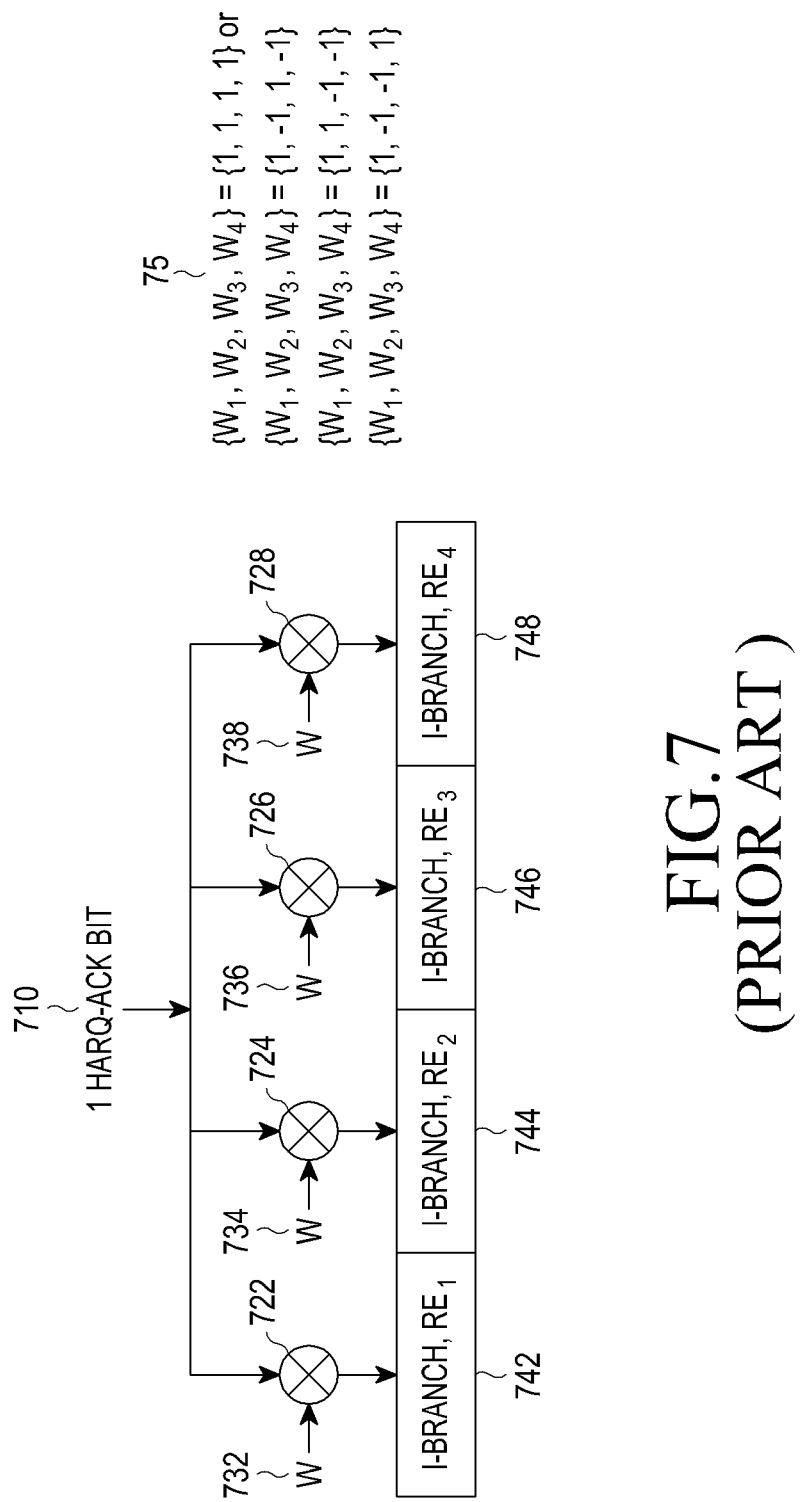
FIG. 7 is a diagram illustrating a conventional transmission of a HARQ-ACK bit in a cPHICH.
Figure 8:
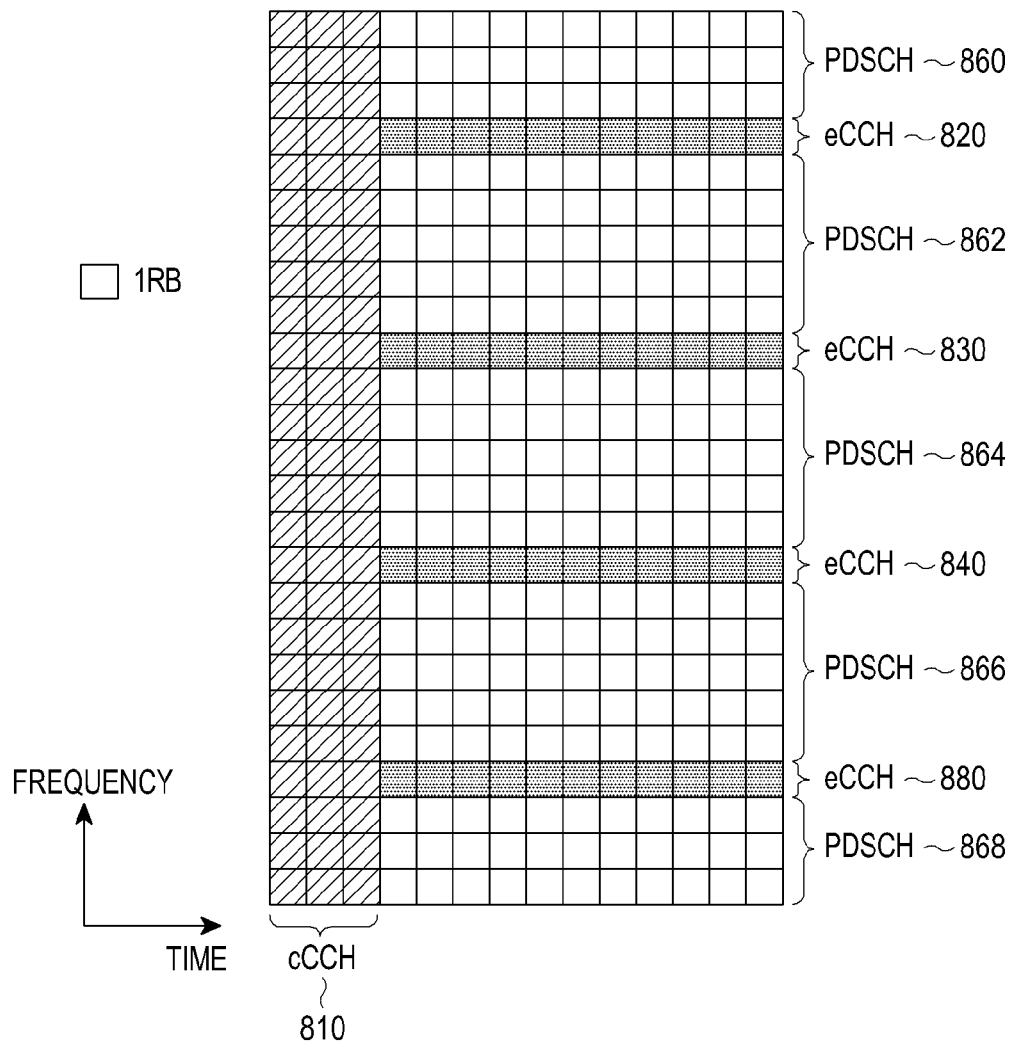
FIG. 8 is a diagram illustrating a conventional structure using RBs for eCCH transmissions.

Referring to FIG. 13, for simplicity an RB includes eREGs for an ePHICH transmission during two OFDM symbols resulting in WH codes of "1, 1" and "1, −1". The multiplication of ePHICH eREG REs by "1" in a first OFDM symbol 1310 is implied and application of a WH code of length 4 in the frequency domain (across REs of a same eREG) as in FIG. 7 is omitted for brevity. The multiplication of ePHICH eREG REs in a second OFDM symbol 1320 can be with "1" (implied) or with "−1" (sign reversal) 1330 depending on a WH code assigned to a UE for a respective ePHICH group.

A NodeB transmitter functionality for transmitting an ePHICH and a UE receiver functionality for receiving an ePHICH are same with respective ones for a cPHICH. If an orthogonal code in the time domain is introduced for an ePHICH transmission, the same functionality as for the frequency domain orthogonal code applies at a NodeB transmitter (spreading) and a UE receiver (de-spreading). A description thereof is omitted for brevity.

Introduction of time-domain orthogonality and frequency domain orthogonality for an ePHICH transmission improves robustness and suppresses interference as spreading of transmitted information applies in both the time domain and the frequency domain. For example, when two ePHICHs (for two different UEs) with significantly different transmission powers are multiplexed on a same QPSK symbol, a stronger ePHICH transmission will often corrupt a weaker ePHICH due to imperfect channel estimation at a UE. This is also known as I/Q imbalance. To circumvent this problem, ePHICH transmissions in the in-phase (I) QPSK component use an orthogonal code in the time domain (in FIG. 13, the "1 1" code) and ePHICH transmissions in the Quadrature (Q) QPSK component use another orthogonal code in the time domain (in FIG. 13, the "1 −1" code).

A number of ePHICH groups is signaled to a UE either by broadcast signaling, similar to the signaling of a number of cPHICH groups, or by UE-specific higher layer signaling. A new parameter $N_g^{new}$ is informed to UEs similar to the $N_g$ parameter informed to UEs for cPHICH transmissions. For example, $N_g^{new}$ includes 2 bits, which may or may not map to the same values as the 2 bits of $N_g$. The number of ePHICH groups is $N_{ePHICH}^{group} = \lceil N_g^{new}(N_{RB}^{DL}/8) \rceil$, or if UEs know $N_{RB}^{UL}$ before receiving ePHICHs, $N_{ePHICH}^{group} = \lceil N_g^{new}(N_{RB}^{UL}/8) \rceil$.

An ePHICH resource is also identified by an index pair $(n_{ePHICH}^{group}, n_{ePHICH}^{seq,freq})$, where $n_{ePHICH}^{group}$ is an ePHICH group number and $n_{ePHICH}^{seq,freq}$ is an orthogonal code index in the frequency domain within a group (length 4 WH code for an eREG consisting of 4 REs). For an orthogonal code length in the frequency domain of $N_{SF,freq}^{ePHICH}$, an ePHICH group number is determined using Equation (4).

$$n_{ePHICH}^{group} = (I_{PRB\_RA}^{lowest\_index} + CSI) \bmod N_{ePHICH}^{group} \quad (4)$$

The orthogonal sequence index (in the frequency domain) is determined using Equation (5).

$$n_{ePHICH}^{seq,freq} = (\lfloor I_{PRB\_RA}^{lowest\_index}/N_{E\text{-}PHICH}^{group} \rfloor + CSI) \bmod (2N_{SF,freq}^{ePHICH}) \quad (5)$$

If an orthogonal code with a length $N_{SF,time}^{ePHICH}$ is applied in the time domain, the orthogonal code can be used either for improved robustness and interference suppression, as described above, or for increasing a multiplexing capacity over a number of eREGs equal to a length of an orthogonal code in the time domain. If an orthogonal code in the time domain is used to improve robustness and suppress interference, orthogonal covering in the time domain is just a complementary part of repetitions for an ePHICH transmission.

If an orthogonal code in the time domain is used to increase an ePHICH multiplexing capacity, an ePHICH resource index should also include an orthogonal sequence index in the time domain $n_{ePHICH}^{seq,time}$ and be given by the triplet $(n_{ePHICH}^{group}, n_{ePHICH}^{seq,freq}, n_{ePHICH}^{seq,time})$. For example, the derivations shown in Equation (6), (7), and (8) may apply.

$$n_{ePHICH}^{seq} = (\lfloor I_{RB\_RA}^{lowest\_index}/N_{ePHICH}^{group} \rfloor + CSI) \bmod (2N_{SF,freq}^{ePHICH} \cdot N_{SF,time}^{ePHICH}) \quad (6)$$

$$n_{ePHICH}^{seq,freq} = n_{ePHICH}^{seq} \bmod (2N_{SF,freq}^{ePHICH}) \quad (7)$$

$$n_{ePHICH}^{seq,time} = \lfloor n_{ePHICH}^{seq}/N_{SF,freq}^{ePHICH} \rfloor \quad (8)$$

In Equations (6), (7), and (8), all orthogonal codes in the frequency domain are first allocated before the allocation of a next orthogonal code in the time domain. Alternative derivations may also apply.

For example, the allocation of orthogonal codes in the frequency and time domains may be interleaved and for 4 WH codes in the frequency domain and 2 WH codes in the time domain, the (frequency, time) pairs of WH codes can be allocated as (first, first), (second, first), (first, second), (second, second), (third, first), (fourth, first), (third, second), (fourth, second). Additionally, a number of ePHICH groups can be modified as $N_{ePHICH}^{group} = \lceil N_g^{new}(N_{RB}^{DL}/(8 \cdot N_{SF,time}^{ePHICH})) \rceil$ because a number of ePHICHs within an ePHICH group increases from the multiple between the 2 QPSK constellation points and $N_{SF,freq}^{ePHICH}$ (factor of 4 for a eREG of 4 REs) to also include $N_{SF,time}^{ePHICH}$ (that is, a number of ePHICHs increases by a factor of $N_{SF,time}^{ePHICH}$). If UEs can know $N_{RB}^{UL}$ before ePHICH receptions, $N_{ePHICH}^{group} = \lceil N_g^{new}(N_{RB}^{UL}/(8 \cdot N_{SF,time}^{ePHICH})) \rceil$.

A UE may be configured by a NodeB through higher layer signaling to decode either a cPHICH or an ePHICH. As a cPHICH resource or an ePHICH resource is implicitly determined from a smallest RB index, $I_{RB\_RA}^{lowest\_index}$, of a PUSCH conveying a data TB corresponding to a HARQ-ACK bit, both a cPHICH resource and an ePHICH resource may be available to a UE (depending on the selection of the CSI values for other UEs to which a NodeB transmits an HARQ-ACK signal in a same subframe). Accordingly, a NodeB may then configure a UE to receive both a cPHICH and an ePHICH. In this case, a UE performs soft combining of the two signals in a cPHICH and an ePHICH before making a decision for each HARQ-ACK bit. This can be particularly useful for UEs in poor coverage conditions for which it is difficult to provide accurate reception for either a cPHICH or an ePHICH.

Figure 14:
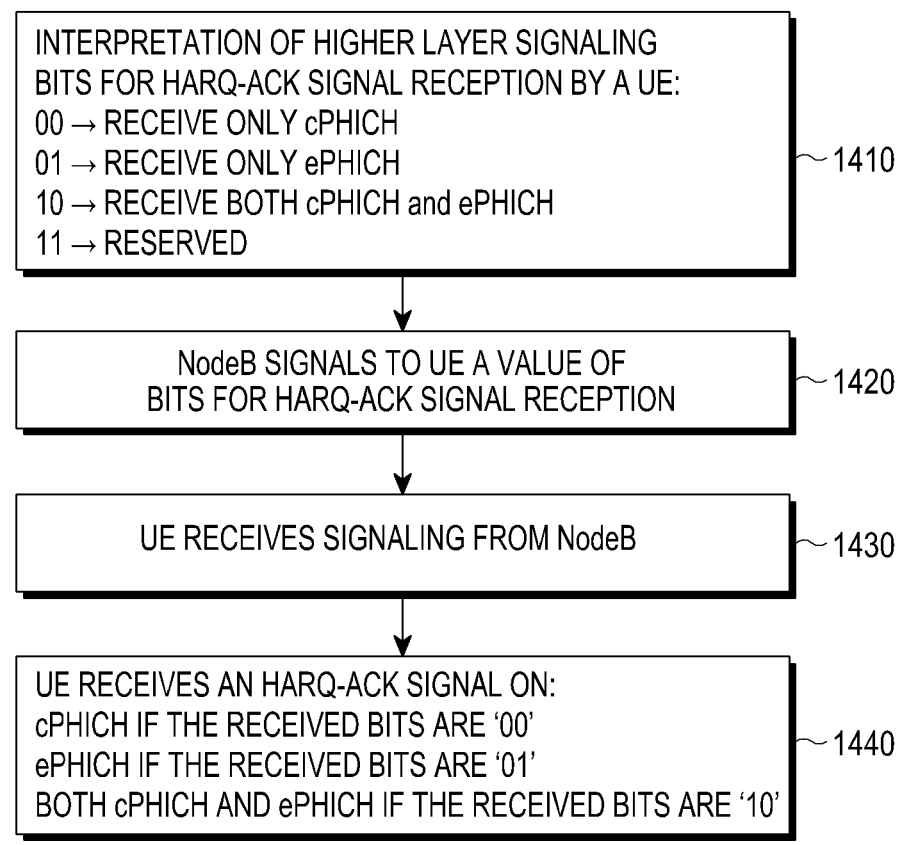
FIG. 14 is a diagram illustrating a process for a UE to receive an HARQ-ACK signal transmitted in an ePHICH, or in a cPHICH, or in both an ePHICH and a cPHICH according to an embodiment of the present invention.

FIG. 14 illustrates a process for a UE to receive a HARQ-ACK signal transmitted in an ePHICH, or in a cPHICH, or in both an ePHICH and a cPHICH, according to an embodiment of the present invention.

Referring to FIG. 14, a NodeB communicates to a UE 2 bits 1420, e.g., using RRC signaling, which indicate reception of a HARQ-ACK signal, either through a cPHICH, e.g., with the value of '00', or through an ePHICH, e.g., with the value of '01', or through both a cPHICH and an ePHICH, e.g., with the value of '10', and one value remains reserved 1410. A UE receives higher layer signaling from a NodeB 1430 and determines whether HARQ-ACK signal reception is through a cPHICH (for example, the value of the 2 bits is '00'), or through an ePHICH (for example, the value of the 2 bits is '01'), or through both a cPHICH and an ePHICH (for example, the value of the 2 bits is '10') 1440. The UE behavior does not need to be specified if the reserved value is received because this indicates that the NodeB incorrectly configured the UE operation.

In accordance with an embodiment of the present invention, a transmission of a DCI format with UE-common information (as identified by a sequence/RNTI used to scramble a CRC of a DCI format) in a CSS of an eCCH region (eCSS) is provided. The feasibility to transmit DCI formats in an eCSS should be possible for any size of an eCCH region and independent of a correct or incorrect ePCFICH reception, if any. Consequently, as for ePCFICH and ePHICH, an eCSS is exclusively confined in RBs and a NodeB semi-statically configures for transmitting eCCHs. ePDCCH transmissions in a UE-DSS (eUE-DSS) include a set of eCCEs following the same principles as cPDCCH transmissions in a cUE-DSS including another set of cCCEs.

Figure 15:
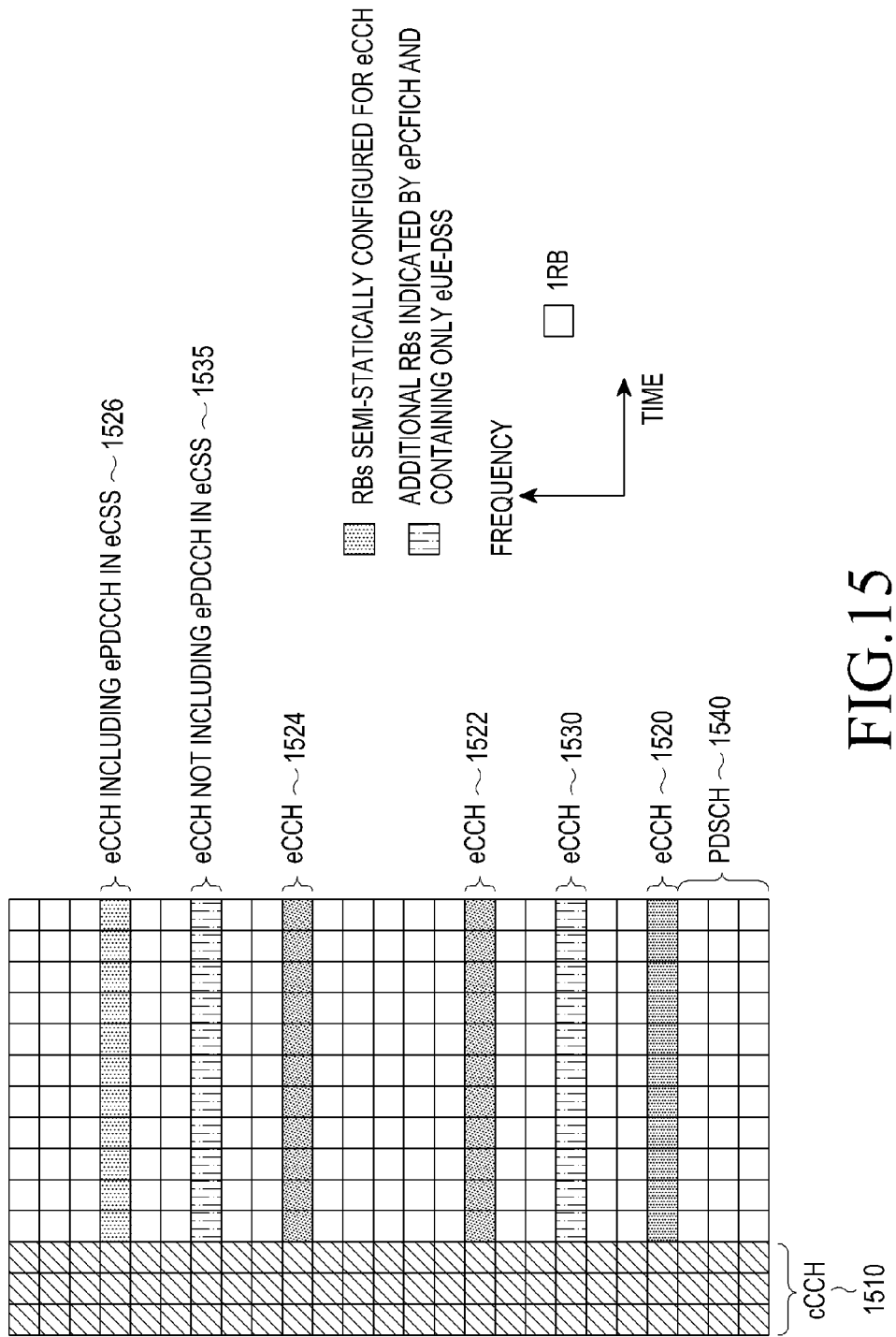
FIG. 15 is a diagram illustrating transmissions of ePDCCHs in an eCSS according to an embodiment of the present invention.

FIG. 15 illustrates transmissions of ePDCCHs in an eCSS according to an embodiment of the present invention.

Referring to FIG. 15, a NodeB semi-statically configures RBs for an eCSS. After transmitting cCCHs 1510, ePDCCHs are transmitted in an eCSS in eCCEs including eREGs in two RBs semi-statically configured by a NodeB 1520, 1522, 1524, and 1526. Additional RBs in a subframe may be used to transmit ePDCCHs in a UE-DSS that may be indicated by an ePCFICH 1530 and 1535. The remaining RBs are used for PDSCH transmissions 1540.

As described above, transmissions of ePCFICH and ePHICH are also in eREGs of semi-statically configured RBs. The eREGs available for an eCSS are determined from eREGs available in semi-statically configured RBs, after excluding eREGs allocated to transmissions of ePCFICH and of ePHICHs. Further, depending on the availability of eCCEs in semi-statically configured RBs over a subframe, a NodeB may also transmit ePDCCHs conveying DCI formats with UE-specific information in an eCSS.

The eREGs in a set of RBs used for transmissions of eCCHs are assumed to be numbered first in the frequency domain, across RBs, and subsequently in the time domain across OFDM symbols used for transmissions of eCCHs. However, eREGs in the semi-statically configured RBs (and the associated eCCEs) are numbered first and eREGs (and the associated eCCEs) in additional RBs, as possibly indicated by an ePCFICH, are numbered afterwards.

Figure 16:
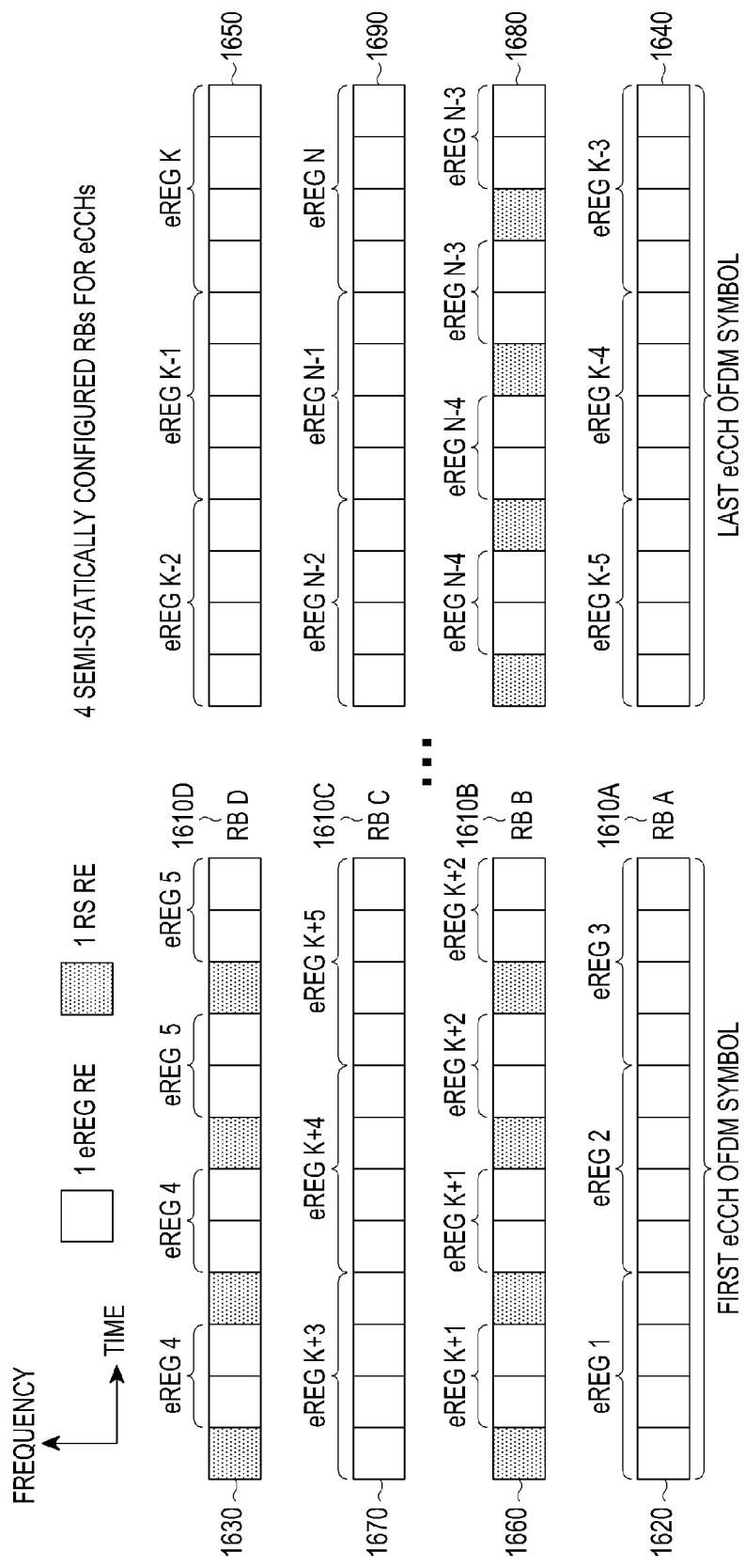
FIG. 16 is a diagram illustrating a numbering for a total of N eREGs for transmissions of eCCHs according to an embodiment of the present invention.

FIG. 16 illustrates a numbering for a total of N eREGs for transmitting eCCHs according to an embodiment of the present invention.

Referring to FIG. 16, RB A 1610A and RB D 1610D are RBs a NodeB semi-statically configured and are numbered first because eREGs used to transmit ePDCCHs in an eCSS, ePHICHs, and ePCFICH should remain invariant and not depend on an ePCFICH value. RB B 1610B and RB C 1610C are dynamically indicated by an ePCFICH in a subframe and associated eREGs used to transmit ePDCCHs in a UE-DSS are numbered after ones in RB A and RB D.

Following the principles above, in a first OFDM symbol for transmitting eCCHs, RB A includes eREG1, eREG2, and eREG3 1620 and RB D includes eREG4 and eREG5 1630. In the last OFDM symbol for transmitting eCCHs, RB A includes eREG(K−4), eREG(K−3), and eREG(K−2) 1640 and RB D includes eREG(K−2), eREG(K−1), and eREG(K) 1650. An RB may include an RS in one OFDM symbol, but not contain an RS in another OFDM symbol and it may contain different RS types in different OFDM symbols. The eREG numbering continues with eREGs in RB B 1660 and eREGs in RB C 1670 in a first OFDM symbol for transmitting eCCHs and completes with eREGs in RB B 1680 and eREGs in RB C 1690 in a last OFDM symbol for transmissions of eCCHs.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for transmitting a control signal and a reference signal by a base station, the method comprising the steps of:
    configuring a first set of frequency resource blocks (RBs) and a second set of the frequency RBs, wherein each of the frequency RBs includes resource elements (REs);
    transmitting, to a user equipment (UE), the control signal over a first number of symbols in a transmission time interval (TTI) and over a first number of the REs included either in the first set of the frequency RBs or in the second set of the frequency RBs; and
    transmitting, to the UE, the reference signal over a second number of symbols in the TTI and over a second number of the REs included either in the first set of the frequency RBs or in the second set of the frequency RBs,
    wherein the first set of the frequency RBs is indicated to the UE by higher layer signaling or by broadcast signaling, and the second set of the frequency RBs is indicated to the UE by a physical control format indicator channel (PCFICH),
    wherein the first number of symbols and the second number of symbols are included in a data region of a subframe, and
    wherein the reference signal is a demodulation reference signal (DMRS).

2. The method of claim 1, wherein for a same antenna port, the control signal and the reference signal are transmitted based on a same precoding scheme.

3. The method of claim 1, wherein the second set of the frequency RBs does not include any of frequency RBs included in the first set of the frequency RBs.

4. The method of claim 1, wherein each RB over the TTI includes RE groups (REGs), where the REGs are first numbered for frequency RBs in the first set of the frequency RBs and are subsequently numbered for the frequency RBs in the second set of the frequency RBs.

5. A method for receiving a control signal and a reference signal by a user equipment (UE), the method comprising the steps of:
receiving, from a base station, the control signal over a first number of symbols in a transmission time interval (TTI) and over a first number of resource elements (REs) included either in a first set of frequency resource blocks (RBs) or in a second set of the frequency RBs; and
receiving, from the base station, the reference signal over a second number of symbols in the TTI and over a second number of the REs included either in the first set of the frequency RBs or in the second set of the frequency RBs,
wherein the first set of the frequency RBs is indicated to the UE by higher layer signaling or by broadcast signaling, and the second set of the frequency RBs is indicated to the UE by a physical control format indicator channel (PCFICH),
wherein the first number of symbols and the second number of symbols are included in a data region of a subframe, and
wherein the reference signal is a demodulation reference signal (DMRS).

6. The method of claim 5, wherein for a same antenna port and a same RB, the control signal and the reference signal are transmitted by the base station using a same precoding scheme.

7. The method of claim 5, wherein the second set of the frequency RBs does not include any of frequency RBs included in the first set of the frequency RBs.

8. The method of claim 5, wherein each RB over the TTI includes RE groups (REGs), where the REGs are first numbered for the frequency RBs in the first set of the frequency RBs and are subsequently numbered for frequency RBs in the second set of the frequency RBs.

9. A base station, comprising:
a processor configured to configure a first set of frequency resource blocks (RBs) and a second set of the frequency RBs, wherein each of the frequency RBs includes resource elements (REs); and
a transmitter configured to transmit, to a user equipment (UE), a control signal over a first number of symbols in a transmission time interval (TTI) and over a first number of the REs included either in the first set of the frequency RBs or in the second set of the frequency RBs, and transmit, to the UE, a reference signal over a second number of symbols in the TTI and over a second number of the REs included either in the first set of the frequency RBs or in the second set of the frequency RBs,
wherein the first set of the frequency RBs is indicated to the UE by higher layer signaling or by broadcast signaling, and the second set of the frequency RBs is indicated to the UE by a physical control format indicator channel (PCFICH),
wherein the first number of symbols and the second number of symbols are included in a data region of a subframe, and
wherein the reference signal is a demodulation reference signal (DMRS).

10. The base station of claim 9, wherein for a same antenna port, the control signal and the reference signal are transmitted based on a same precoding scheme.

11. The base station of claim 9, wherein the second set of the frequency RBs does not include any of frequency RBs included in the first set of the frequency RBs.

12. The base station of claim 9, wherein each RB over the TTI includes RE groups (REGs), where the REGs are first numbered for frequency RBs in the first set of the frequency RBs and are subsequently numbered for frequency RBs in the second set of the frequency RBs.

13. A user equipment (UE), comprising:
a receiver configured to receive, from a base station, a control signal over a first number of symbols in a transmission time interval (TTI) and over a first number of resource elements (REs) included either in a first set of frequency resource blocks (RBs) or in a second set of the frequency RBs, and receive, from the base station, a reference signal over a second number of symbols in the TTI and over a second number of the REs included either in the first set of the frequency RBs or in the second set of the frequency RBs,
wherein the first set of the frequency RBs is indicated to the UE by higher layer signaling or by broadcast signaling, and the second set of the frequency RBs is indicated to the UE by a physical control format indicator channel (PCFICH),
wherein the first number of symbols and the second number of symbols are included in a data region of a subframe, and
wherein the reference signal is a demodulation reference signal (DMRS).

14. The UE of claim 13, wherein for a same antenna port and a same RB, the control signal and the reference signal are transmitted by the base station using a same precoding scheme.

15. The UE of claim 13, wherein the second set of the frequency RBs does not include any of frequency RBs included in the first set of the frequency RBs.

16. The UE of claim 13, wherein each RB over the TTI includes RE groups (REGs), where the REGs are first numbered for the frequency RBs in the first set of the frequency RBs and are subsequently numbered for frequency RBs in the second set of the frequency RBs.

* * * * *